Nov. 17, 1931.　　　　C. W. NANCE　　　　1,832,235
TREATMENT OF HIDES FOR THE PRODUCTION OF LEATHER
Filed Sept. 8, 1926　　2 Sheets-Sheet 1
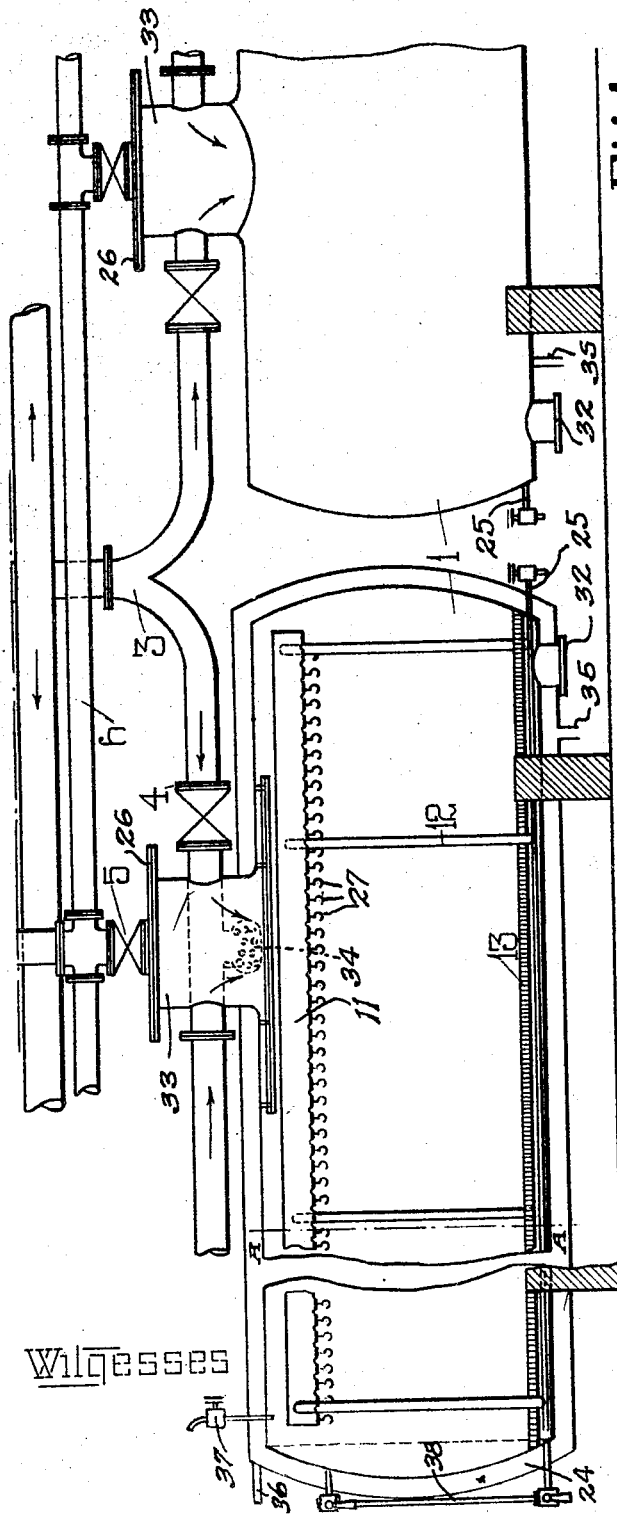
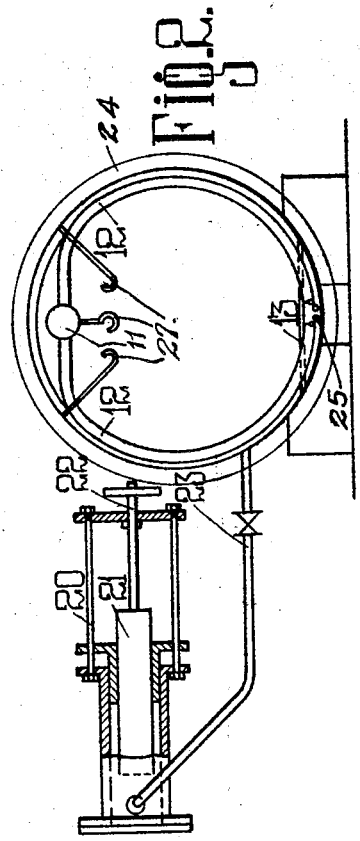

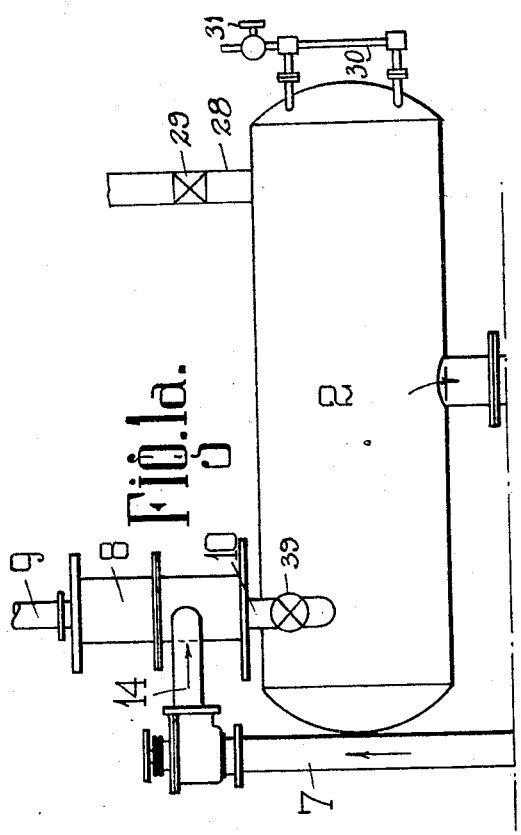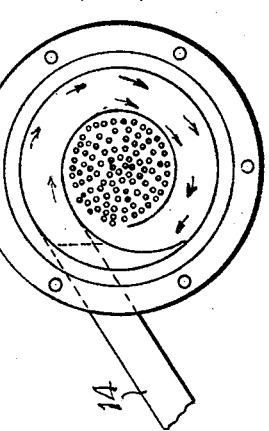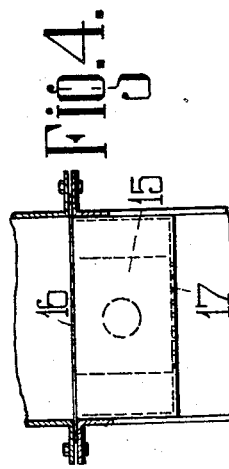

Patented Nov. 17, 1931

1,832,235

UNITED STATES PATENT OFFICE

CHARLES WESLEY NANCE, OF LONDON, ENGLAND

TREATMENT OF HIDES FOR THE PRODUCTION OF LEATHER

Application filed September 8, 1926, Serial No. 134,246, and in Great Britain October 29, 1925.

The present invention relates to the treatment of hides and tanning, and has for its object an improved process for effecting the entry of the tanning solution into the leather.

A further object of the invention is to provide means whereby the treating liquor is caused to boil violently and to circulate by thermosyphonic action over the hides.

A still further object is to collect the foam produced and cause it to re-assume the liquid form for further treatment of the hides.

Other objects of the invention will be apparent from the following description and the appended claims.

A preferred form of apparatus for carrying out the process according to the invention is shown in the accompanying drawings in which Figure 1a shows an elevation of a subsidiary autoclave showing the foam pipe, aspirator pipe and liquor outlet.

Figure 1b is an elevation of a part of a complete instalment of autoclaves showing a pair situated below, and in connection with the subsidiary autoclave shown in Figure 1a.

Figure 2 shows a sectional elevation of an autoclave on the line A—A of Figure 1b.

Figure 3 shows a plan view of the foam trap, and

Figure 4 shows a sectional elevation of the foam trap.

Referring now to the drawings, the two main autoclaves 1 are connected to the subsidiary autoclave 2 by the common pipe 3 and the valves 4. The autoclaves 1 also communicate by the valves 5 with the vacuum main 6. This vacuum main 6 also communicates in turn with the pipe 7 connected to the foam trap 8 by the pipe 14. This connects to the aspirator at 9 and has a draining pipe 10 for the separated liquid, leading to the autoclave 2.

Each of the autoclaves 1 has a double wall forming a space 24 and is fitted with a steam heating coil 25.

In each of the autoclaves 1 there is a large copper spraying pipe 11 running along the top from end to end. This pipe is sealed at the ends but has a number of perforations on its length preferably in its lower surface, which act as sprays for the liquor supplied to the pipes. At intervals along its length, the spray pipe 11 communicates with the circulator pipes 12 which conform to the contour of the autoclave 1. These pipes after passing down the curved sides of the autoclave, terminate below a perforated false bottom 13 and have open ends.

The autoclaves 1 have domes 33, inside each of which is a spraying rose 34 attached to the liquor supply pipe 3, and also have drain cocks 32. The shell of the autoclave is fitted with an inlet 35 and an outlet 36. The autoclave 1 is provided with a gas inlet cock 37 and a gauge 38.

Referring to Figure 2 there is provided on the autoclave 1 a ram 20 comprising a plunger 21 and threaded operating spindle 22 connected to the autoclave by pipe 23. The autoclave 2 has a liquor supply pipe 28 with valve 29 and with a gauge glass 30 and an upper air cock 31.

The autoclaves 1 are provided with one or more large doors 26 and with three rows of hooks 27 from which to hang the hides. The three rows of hooks longitudinal of the tank produce a plurality of transverse sets of three hooks which serve to hang the hides in the autoclaves. These transverse sets of three hooks are one inch apart.

The foam trap 8 is constituted by a cylindrical casing with a vapour inlet 14, an aspirator connection 9, and a draining pipe 10 fitted with valve 39. The vapour from the autoclave 1 passes into the foam trap 8, impinges on the spiral baffle plate 15 and subsequently passes upwards through the perforated baffle plate 16. The liquid separated from the vapours falls through the perforated plate 17 and through the connection 10 into the autoclave 2.

For simplicity's sake, the operation of tanning will be described as being carried out in a single autoclave, it being understood that a battery of autoclaves is used in practice, several of which are at any given stage of the process simultaneously.

The process for the treatment of hides according to the invention is as follows:—

The dried or semi-dried hides are hung in the autoclave 1 on the hooks 27. The door 26 is then hermetically sealed. A high vacuum is then applied, which operates for about half an hour, in order to take all the air out of the hides. When this is accomplished, a suitable amount of water containing a small percentage of sodium sulphide or other suitable material which has previously been de-aerated by a vacuum applied to the autoclave 2 is drawn into the autoclave 1 by closing the valve 39 and opening the air cock 31. The water is drawn in by the vacuum and passes through the spraying rose 34 and by this spraying into a vacuum is still further de-aerated.

The level of the liquid in the autoclave is shown by gauge glass 38.

Heat is now applied to the bottom of the autoclave by means of the steam pipe 25 raising the temperature of the solution to 90° F. which combined with the vacuum produces a violent ebullition which knocks the hides about.

After a few hours the liquor is run off by drain cock 32 and a lime liquor which has also undergone a de-aeration treatment is drawn in in suitable amount, the same operation as that described above is gone through and at the same temperature. This continues for twelve hours when the lime liquor is run off and the hides taken out of the autoclave. After being unhaired fleshed and scudded, they are again hung in the autoclave for the purpose of deliming them; water which contains a small percentage of boric acid is drawn in until the hides are covered. Similar operations as for soaking and liming are repeated. This continues for several hours. The deliming solution is then run off, and water is again drawn into the autoclave to wash the boric acid solution from the surface of the hides. This is quickly accomplished and the water is then run off.

A high vacuum is then allowed to operate on the hides for half an hour so that all the air contained in them is taken away.

Tan liquor which has previously been de-aerated as described above is then drawn in. The same operations as those described above are then carried out, keeping the temperature at 90° F.

When these operations have been going on for a few hours the valve 5 is closed and the valve 4 in the pipe 3 connected to the bottom of autoclave 2 is opened and the liquor contained in it collected from the spray by the foam trap 8, runs by gravitation into the autoclave until a small pressure is created. The valve 4 is then closed and a further pressure of from 40 lbs. to the square inch and upwards is obtained by the use of the ram 20. This pressure is allowed to remain for half an hour, it is then released and the liquor run off through cock 32 to a storage pit for further use, or on to another batch of hides in another autoclave; to go through the same operation and so on until all the tannin is taken out of the liquor which is then run away.

A stronger tan liquor is then drawn into the first autoclave to undergo the same operations with the difference the the temperature is maintained at 100° F. A final tanning treatment is given with a third and last liquor of high density at a temperature of 130–140° F. The leather which is then completely filled with tannin, is next washed with the lightest tan liquor or water as described above.

The tanned leather is then left hanging in the autoclave in which it was tanned, and a high vacuum applied. It is then dried by heating to 130–140° F. For this purpose, steam or hot gas is passed into the space 24 through the inlet 35 and withdrawn through the outlet 36. Alternatively the space between the walls may be partly filled with water and the whole autoclave heated. The temperature inside the autoclave is regulated by letting in cold gases of combustion.

This operation lasts about twelve hours.

The leather so obtained is completely dry and of a uniform pale colour.

It is taken out and finished in the usual way.

It will be seen that in the process above described there are only four handlings of the hides during the whole operation.

If desired the leather may be finished by impregnation with a suitable waterproofing agent e. g. rubber. For this purpose it is placed in the autoclave which is then exhausted and a solution or emulsion of rubber run in. Pressure is then applied to the liquid in the autoclave by means of the ram until suitable penetration is effected. The remaining solution is then run out and the leather dried.

What I claim is:

1. An apparatus for the treatment of hides comprising an autoclave, with means for suspending hides therein, internally provided with a false bottom and tubes extending from below such false bottom to the upper part of the autoclave for the circulation of the liquors, pipes to supply liquors to and remove liquors from said autoclave, means to evacuate said autoclave, and a subsidiary autoclave above the main autoclave and intermediate between it and the vacuum apparatus and adapted to provide a supply of liquor for the said main autoclave.

2. An apparatus for the treatment of hides comprising an autoclave with means for suspending hides therein internally provided with a false bottom and tubes extending from below such false bottom to the upper part of the autoclave for the circulation of liquors, pipes to supply liquor to and remove liquor from said autoclave, means to evacuate said autoclave and a subsidiary autoclave above the main autoclave and intermediate between it and the vacuum apparatus, adapted to provide a supply of liquor for the said main autoclave, and communicating with the said vacuum apparatus through a foam trap consisting of a chamber with baffles and mains for draining trapped liquid into said subsidiary autoclave.

3. An apparatus for treating hides comprising a main autoclave means for hanging the hides in said autoclave, means for heating same, a subsidiary autoclave above said main autoclave a foam trap adapted to return the liquor carried off as foam to said subsidiary autoclave, a connection between said foam trap and said main autoclave, and means for evacuating said main and subsidiary autoclaves.

4. An apparatus for treating hides comprising a main autoclave means for hanging the hides in said autoclave, means for heating same, a subsidiary autoclave above said main autoclave, a foam trap, a valved connection between the bottom of said foam trap and said subsidiary autoclave, a valved connection between said foam trap and said main autoclave, and means for evacuating said main and subsidiary autoclaves.

5. An apparatus for treating hides including a foam trap having a spiral baffle plate, adapted to act by centrifugal action on the foam carried over.

6. An apparatus for treating hides comprising an autoclave, means for evacuating same, and a foam trap, having baffle plates and a liquor draining pipe between said autoclave and said means.

In witness whereof I have hereunto signed my name this 27th day of July, 1926.

CHARLES WESLEY NANCE.